INVENTOR.
A. D. HOLIDAY

United States Patent Office 3,507,762
Patented Apr. 21, 1970

3,507,762
METHOD FOR INHIBITING DARK REACTION IN HYDROCARBON PHOTOHALOGENATION PROCESSES
Alian D. Holiday, Bartlesville, Okla., assignor to Phillips Petroleum Company, a corporation of Delaware
Filed Mar. 10, 1967, Ser. No. 622,224
Int. Cl. C07c 175/00
U.S. Cl. 204—163    7 Claims

ABSTRACT OF THE DISCLOSURE

Controlled amounts of oxygen are added to the halogen or hydrocarbon feed streams in a hydrocarbon photohalogenation process upstream of the mixing zone to inhibit undesirable dark reactions in the feed system between the mixing zone and the photoreaction zone.

---

This invention relates to photohalogenation of hydrocarbons. In one aspect, this invention relates to an improved method for producing a high yield of monohalogenated hydrocarbon derivatives. In another aspect, this invention relates to a method for preventing dark deactions in the photoreaction feed system.

In the production of some chemicals, halogenation of hydrocarbons is performed by various photochemical techniques. One application of such a process is the production of monochlorides of paraffinic hydrocarbons for the manufacture of biodegradable detergents. One commonly used photochemical process for the chlorination of hydrocarbons includes the step of mixing the chlorine and hydrocarbon in the dark prior to introduction into the photoreactor wherein the photochemical reaction is carried out by exposing the mixture to light energy.

For the most part, this mixing of the halogen or hydrocarbon in the dark is an acceptable and efficient technique for obtaining a product with a high yield and uniform concentration of the monohalogenated derivative of the hydrocarbon, but it is not free from problems. Occasionally, the halogen and hydrocarbon will react, in an uncontrolled manner, even at reasonably low temperatures in the feed system upstream of the reactor. This reaction, commonly referred to as a dark reaction, is characterized by a significant temperature increase in the reactor feed mixture and can produce several undesirable effects.

The dark reaction can result in the halogenation reaction being as high as 90 percent complete prior to introduction of the feed mixture into the reactor. Depending on various factors, such as temperature, pressure, residence time and the like, the composition of the feed into the photoreactor, when a dark reaction has occurred, will vary considerably and is highly unpredictable. The varied composition of the feed mixture can result in a reactor product having higher yields of the polyhalogenated derivative of the hydracarbon, and consequently a lower yield of the monohalogenated derivative of the hydrocarbon which is the desired product, with nonuniform concentrations of both of these derivatives.

Under some temperature and pressure conditions, small amounts of carbon are produced from the dark reaction. The carbon can obstruct the light transmission in the reactor and decrease the efficiency thereof by depositing on the transparent windows of the reactor, if an external light source is used, or by depositing on the light lens, if an internal light source is used.

The dark reaction can also result in mixed phase flow in the feed system because of the temperature increase and release of hydrogen chloride resulting therefrom. Most, if not all, reactor designs are based upon the feed being completely liquid. The change in flow dynamics resulting from the mixed phase flow can adversely affect reactor performance.

This dark reaction is most prevalent in chlorination processes but can also occur in bromination processes under certain conditions of temperature, pressure, and mol ratios of halogen to hydrocarbon.

I have found that the dark reaction can be terminated or prevented by injecting small amounts of oxygen into either the halogen or hydrocarbon feed prior to mixing the two together so that the total oxygen content in the mixed feed to the photoreactor is maintained at a level high enough to inhibit the reaction in the feed system. The oxygen content in the hydrocarbon feed for most commercial processes will be relatively constant, usually less than 5 parts per million by weight. The oxygen content of the halogen can vary over a relatively large range, as low as less than 10 parts per million by weight to as high as more than several hundred parts per million by weight. This wide variation of oxygen concentrations in the halogen can result from several factors, such as the initial purity of the halogen, kind and pressure of the pressurizing medium used, length of time the system is pressurized, air leaks in storage vessels and supply lines, and the like. From my observations it appears that this variation in the oxygen concentration in the halogen is the cause of the spasmodic nature in which the dark reaction occurs. When the halogen is high purity, i.e. low oxygen concentration, the probability of a dark reaction is high, whereas a dark reaction does not occur when the oxygen concentration in the mixed feed is high enough. The ostensible effect of the oxygen is to inhibit the halogenation reaction until the mixed feed is exposed to light energy.

Accordingly, an object of this invention is to provide an improved method for the photohalogenation of hydrocarbons.

Another object of this invention is to provide an improved method for the photohalogenation of hydrocarbon which prduces high yields and uniform concentrations of the monohalogenated derivative of the hydrocarbon.

A further object of this invention is to provide a method, in a process for the halogenation of hydrocarbons, for terminating or preventing a dark reaction between the halogen and hydrocarbon which are premixed prior to introduction into a photoreaction zone.

A still further object of this invention is to provide a method for controlling the oxygen content in the halogen feed stream at a level sufficiently high to prevent a dark reaction.

Other objects, aspects and advantages of this invention will be apparent to those skilled in the art from the following detailed description, drawing, and appended claims.

According to this invention, oxygen is injected into either of the halogen or the hydrocarbon feed streams upstream of the point of mixing in sufficient quantities to inhibit a dark reaction.

In accordance with one embodiment of this invention, a method is provided for adding oxygen to either the halogen or the hydrocarbon feed stream upon the occurrence of a dark reaction as indicated by an increase in the temperature difference between the temperature of one of the feed streams and the temperature of combined feed streams to the photoreactor downstream of the mixing zone. As discussed previously the dark reaction is characterized by a significant temperature increase in the reactor feed stream. Oxygen is added until the temperature difference returns to a normal operating level.

In accordance with another embodiment of this invention, a method is provided for continually maintaining the concentration of oxygen in the halogen feed stream above a predetermined minimum level in order to preclude the occurrence of a dark reaction in the combined stream. The halogen feed stream is continuously analyzed to determine the oxygen concentration therein and the flow of oxygen, added to halogen or the hydrocarbon feed stream, is manipulated in response to this analysis.

This invention is applicable to any process for the halogenation of hydrocarbons wherein the halogen and hydrocarbon are mixed together prior to introduction into a photoreaction zone and oxygen has an inhibiting effect on the halogenation reaction. Generally, although not limited thereto, the presently known processes of this type include the chlorination and bromination of cyclic and acyclic hydrocarbons having 3 to 20 carbon atoms per molecule. The hydrocarbons which can be used in this type process include aliphatics, preferably saturated, such as propane, normal and isobutane, normal and isopentane, normal and isohexane, normal and isooctane, and higher members of the paraffinic homologous series up to 20 carbon atoms per molecule, aromatics, such as benzene and toluene, and naphthenes, such as cyclohexane. Since fluorination of hydrocarbons generally cannot be performed by a photochemical reaction, it is not considered within the scope of this invention.

The minimum concentration of oxygen in the mixed reactor feed which will adequately inhibit the dark reaction is determined primarily by the particular halogen and hydrocarbon used. Generally, the minimum total oxygen concentration in the feed will be at least 5 parts per million by weight, preferably at least 10.

Excessive amounts of oxygen can adversely inhibit the halogenation reaction in the photoreaction zone. The maximum concentration of oxygen in the reactor feed is limited primarily by the reactor design, light power used, and reactor operating temperature and pressure. Some reactors, such as the plug flow adiabatic type, will operate satisfactorily only with a quite low maximum tolerable oxygen concentration in the feed. Other reactors, such as the downflow type, can operate satisfactorily with the oxygen concentration in the feed materials as high as several hundred parts per million by weight. The inhibiting effect of the oxygen can be overcome to some degree by increasing the light energy available in the photoreaction zone. This amount of additional light energy depends upon many factors, such as reactor design, member of stages, temperature of feed and the like. Because of operating costs associated with higher light energy requirements, unnecessary additions of oxygen should be avoided. Generally, the oxygen concentration in the feed should not exceed 200 parts per million, preferably not above 100 parts per million by weight.

Figure 1:
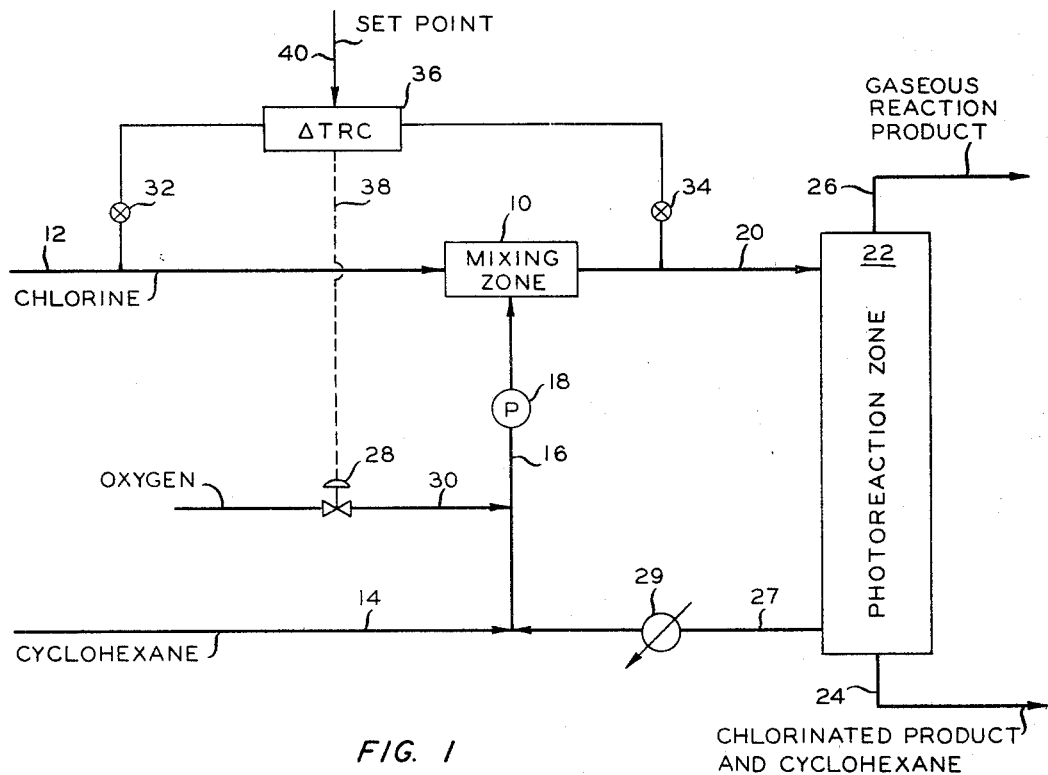
FIGURE 1 is a schematic representation of a photohalogenation system employing one embodiment of this invention wherein the addition of oxygen is controlled in response to an indication of a dark reaction.

For a more complete understanding of the invention reference is made to the drawing and the following detailed description. For purposes of description, and in no way limiting the scope of this invention thereto, this invention will be described in conjunction with a process for chlorinating cyclohexane.

Referring to FIGURE 1, chlorine is introduced into mixing zone 10 through conduit 12 while simultaneously cyclohexane is introduced through conduits 14, 16, and pump 18 into mixing zone 10. The chlorine and cyclohexane are admixed in mixing zone 10 in the dark, the chlorine is dissolved in the cyclohexane, and the resultant solution is introduced into photoreaction zone 22 through conduit 20. In photoreaction zone 22 the resultant solution is exposed to light energy from a source not shown and a portion of the cyclohexane is converted to monochlorocyclohexane and dichlorocyclohexane. A liquid effluent comprising a mixture of the chlorinated product and cyclohexane is withdrawn from photoreaction zone 22 through conduit 24 for further processing and/or separation steps. Gaseous reaction products, primarily hydrogen chloride, are removed from photoreaction zone 22 through circuit 26. A portion of the partially reacted reactants can be withdrawn from photoreaction zone 22 through conduit 27, cooled by cooler 29 and mixed with fresh cyclohexane in conduit 16 to provide temperature control of the reaction in photoreaction zone 22. The amount of cooling is determined by the feed rate, recycle rate and the desired temperature in photoreaction zone 22.

When motor valve 28, disposed in conduit 30, is opened, oxygen is passed through conduit 30 and injected into conduit 16 through which cyclohexane is flowing. The oxygen can also be injected into the chlorine stream in which case conduit 30 would be connected to conduit 12. Any conventional means for obtaining thorough mixing of the oxygen with the stream of material, such as a nozzle disposed within conduit 16 dispersing the oxygen flow concurrently with the cyclohexane flow, can be used. If the oxygen is introduced a reasonable distance upstream of mixing zone 10, a small conduit connected to conduit 16 is adequate, in which case stream turbulence and chemical affinity of the materials will provide adequate mixing. Introducing the oxygen upstream of turbulent-creating devices, such as pump 18, is another technique for providing adequate mixing of the oxygen with the feed material.

The oxygen can be used in its pure gaseous form or as a component of any available gaseous stream which is inert to the photochemical reaction, such as air. Because of reaction temperature considerations the oxygen is preferably gaseous although it is within the scope of this invention to use liquid oxygen or air if the operating conditions permit.

FIGURE 1 exemplifies one embodiment of this invention for controlling the addition of oxygen in sufficient quantities to prevent a dark reaction. As indicated previously a dark reaction produces a significant temperature increase in the reactor feed stream. Temperature measuring means, such as thermocouples, are mounted in the chlorine feed conduit 12 upstream of mixing zone 10 and in the combined feed conduit 20 downstream of mixing zone 10 to sense any temperature increase across mixing zone 10. The thermocouples connect through transducers 32 and 34 to delta temperature recorder-controller 36 which is operatively connected by means, indicated by control line 38, with valve 28. Set point 40 on controller 36 is adjusted so that, as the difference between the temperature of the mixture in conduit 20 and the temperature of the chlorine in conduit 12 reaches a level indicating a dark reaction, controller 36 manipulates valve 28 through control line 38 so that oxygen is admitted through conduit 30 and is admixed with the cyclohexane in conduit 16. As the differential temperature decreases valve 28 is closed so that a lesser amount of oxygen is admixed with the cyclohexane. If the oxygen concentration in the combined feed in conduit 20 is high enough so that no dark reaction occurs, i.e. the temperature differential between the chlorine stream and the combined stream is less than set point 40, valve 28 will be fully closed. If desired, the temperature differential between the hydrocarbon stream and the combined feed stream can be used as the indication of a dark reaction, in which case the temperature measuring means in conduit 12 would be mounted in conduit 16.

Under normal conditions the mixing of the halogen and hydrocarbon in mixing zone 10 results in a finite temperature increase. This temperature increase varies with the halogen and hydrocarbon being used, feed stream temperatures, system pressures, and the like, but generally is not greater than 10° F. Set point 40 on controller 36 is adjusted about this normal differential temperature to preclude unnecessary addition of oxygen.

Figure 2:
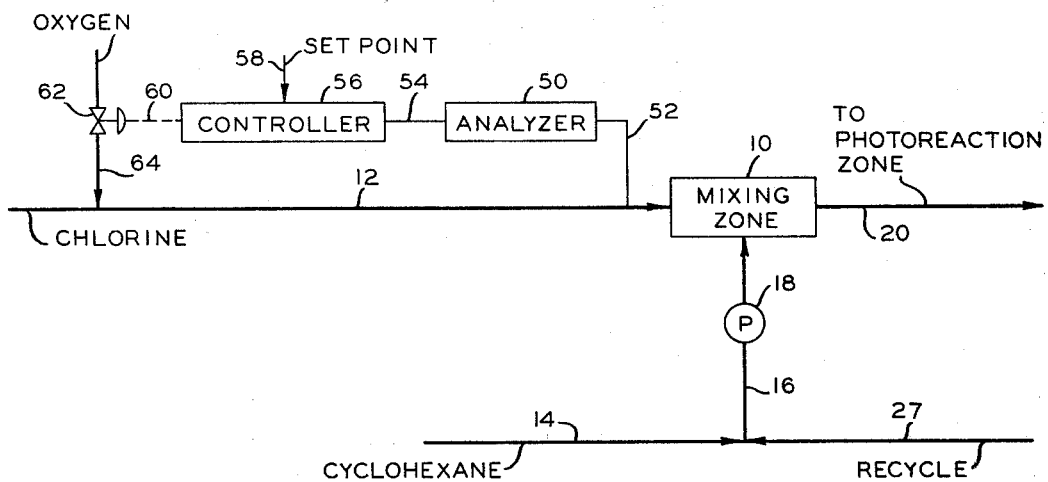
FIGURE 2 is a schematic representation of another embodiment of this invention wherein the addition of oxygen is controlled by a continuous analysis of the halogen feed stream.

In the embodiment shown by FIGURE 2, the chlorine feed in conduit 12 is continuously analyzed by a conventional analyzer 50, such as a chromatographic analyzer. When the gaseous chlorine is used, the sample may be introduced directly from conduit 12 to the analyzer 50 through conduit 52. When liquid chlorine is used the sample is first vaporized by a means not shown prior to introduction into the analyzer. Analyzer 50 determines the concentration of oxygen in the chlorine feed stream, produces a signal representative thereof which is transmitted via signal line 54 to controller 56. Controller 56 compares this signal to set point 58 (level of oxygen concentration that inhibits dark reaction) and produces an output signal through control line 60 which manipulates motor valve 62, disposed in conduit 64, to adjust the flow of oxygen injected into conduit 12 so that the oxygen concentration therein is at least 30 parts per million by weight. By maintaining the oxygen concentration above at least 30 parts per million by weight the dark reaction is prevented from ever occurring. If desired, the oxygen can be added to the cyclohexane feed in conduit 16, in which case conduit 64 would be connected to conduit 16 and the oxygen added would be equivalent to 30 parts per million by weight in the chlorine feed. Again, the maximum quantity of oxygen which can be added without adversely affecting the photochemical reaction is dependent upon the particular type reaction, the halogen and hydrocarbon, and operating conditions being used. Generally, the total amount of oxygen in the halogen or hydrocarbon feed streams should not exceed a concentration equivalent to 200 parts per million by weight in the halogen feed stream.

The following specific examples are presented to illustrate this invention and to clearly demonstrate the elimination of a dark reaction by the addition of oxygen to the halogen or hydrocarbon feed stream. It is not intended that the scope of this invention be limited to the features shown therein.

EXAMPLE I

A feed system as illustrated in FIGURE 1 with the exception of the proposed control technique was used. Feed conduit 20 from mixing zone 10 to photoreaction zone 22 was constructed from a 3-foot length of 3/8-inch Monel tubing having a 0.035-inch wall thickness. Two 250-watt ultraviolet lamps, emitting light in the range of 2,000 to 6,000 Angstroms, were mounted external to a downflow type photoreactor constructed from Pyrex glass tubing. Gaseous chlorine was introduced into mixing zone 10 while simultaneously liquid cyclohexane was introduced into mixing zone 10 through conduit 16. The gaseous chlorine went into solution providing a completely liquid feed through conduit 20 to photoreaction zone 22. The recycled partially reacted reactants were cooled to provide a feed temperature of approximately 100° F. when added to cyclohexane. A liquid reaction product was recovered from photoreaction zone 22 through conduit 24 at a rate of about 4.4 gallons per hour and analyzed with a conventional chromatographic analyzer to determine its composition. The feed temperature upstream of mixing zone 10 and the temperature of the combined feed in conduit 20 were observed to determine the presence of a dark reaction. A temperature increase of approximately 2° F. is normal in the mixing zone. When the dark reaction occurred, temperature increases as high as 35–40° F. were observed. The operating conditions and effluent analysis of a normal run having no dark reaction and one with a dark reaction were as follows:

TABLE I

| Operating conditions | Flow line No. | Normal operation | Dark reaction |
|---|---|---|---|
| Chlorine feed rate, lb./hr | 12 | 7.0 | 6.8 |
| Cyclohexane feed rate, gal./hr | 14 | 4.4 | 4.4 |
| Recycle rate, gal./hr | 27 | 39.6 | 39.6 |
| Feed temperatures upstream of mixing zone 10, °F | 16, 12 | 100 | 101 |
| Feed temperatures downstream of mixing zone 10, °F | 20 | 101 | 138 |
| Photoreaction zone temperature, °F | | 139 | 140 |
| Photoreaction zone pressure, p.s.i.g | | 8 | 8 |
| Effluent analysis, weight percent: | | | |
| Lights | | 0.3 | 0.2 |
| Cyclohexane | | 63.4 | 64.1 |
| Monochlorocyclohexane | | 32.2 | 30.9 |
| Dichlorocyclohexane | | 3.9 | 4.6 |
| Heavies | | 0.2 | ¹ 0.2 |
| Result: | | | |
| Mono/dichloride derivative ratio | | 10.7 | 8.7 |
| Cyclohexane conversion | | 28.2 | 27.6 |

¹ Traces of carbon deposits were observed in the liquid effluent.

From these data it can be seen that the occurrence of a dark reaction, characterized by a significant temperature increase in the combined feed stream, results in a product having higher concentration of dichlorocyclohexane and a lower conversion of the cyclohexane to its chlorinated derivatives.

EXAMPLE II

Air was injected into the feed and reaction system described in Example I through a 1/8-inch line attached to conduit 16 upstream of pump 18 shown in FIGURES 1 and 2. In one run, when a dark reaction was detected by the temperature increase through the mixing zone being greater than 30° F., air was added at a rate of 0.029 standard cubic feet per hour, equivalent to 0.00514 lb./hr. oxygen, and the dark reaction was terminated as indicated by the temperature difference between the chlorine and cyclohexane feed streams and the mixed feed to the photoreactor returning to approximately 2° F. This rate of oxygen addition is equivalent to 81.6 parts per million by weight based on the chlorine feed or 2.38 parts per million by weight based upon the combined feed to the reactor.

In another run the dark reaction was terminated by the addition of 0.006 standard cubic feet per hour which is equivalent to 0.000106 lb./hr. oxygen. This is equivalent to 10.9 parts per million by weight oxygen in the chlorine feed or 0.32 part per million by weight in the combined feed to the reactor. The oxygen concentration in the chlorine feed was less than 20 parts per million by weight and the oxygen concentration in the combined reactor feed was less than 10 parts per million by weight when the dark reaction occurred. The table below presents the operating conditions and results of these runs.

TABLE II

| Operating conditions | Flow line No. | Run 1 [1] | Run 1 [2] | Run 2 [1] | Run 2 [2] |
|---|---|---|---|---|---|
| Chlorine feed rate, lb./hr | 12 | 6.3 | 6.3 | 9.7 | 9.7 |
| Cyclohexane feed rate, lb./hr | 14 | 28.7 | 28.7 | 44.2 | 44.2 |
| Recycle rate, lb./hr | 27 | 181 | 181 | 278 | 278 |
| Feed temperature upstream of mixing zone 10, °F | 16, 12 | 100 | 100 | 101 | 101 |
| Feed temperature downstream of mixing zone 10, °F | 20 | [3] 137 | 102 | [3] 138 | 103 |
| Residence time in feed conduit, sec | | 1.36 | | 0.85 | |
| Photoreaction zone temperature, °F | | 141 | 141 | 142 | 142 |
| Photoreaction zone pressure, p.s.i.g | | 12 | 12 | 8 | 8 |
| Rate of air addition, s.c.f.h | | 0 | 0.029 | 0 | 0.006 |
| $O_2$ equivalent in chlorine feed, p.p.m | | <20 | ap. 100 | <20 | ap. 30 |
| $O_2$ equivalent in combined feed, p.p.m | | <10 | ap. 12 | <10 | ap. 10 |

[1] Before addition of air.
[2] After addition of air.
[3] Traces of carbon were observed in the photoreaction zone liquid effluent.

The cyclohexane rates and monochloro to dichloro mol ratios were equivalent to those obtained in Example I. From these data it can be seen that a dark reaction can be terminated by adding small quantities of oxygen and the photochemical reaction is not adversely affected. These data also indicate that the minimum oxygen concentration should be at least about 30 parts per million by weight in the halogen feed stream and at least about 10 parts per million by weight in the combined feed stream to insure that a dark reaction will not occur.

Reasonable variations and modifications are possible within the scope of this disclosure without departing from the spirit and scope of the invention.

I claim:

1. A photohalogenation process comprising passing a feed stream of a halogen selected from the group consisting of chlorine and bromine and a feed stream of a saturated cyclic or acyclic hydrocarbon having 3 to 20 carbon atoms per molecule capable of being halogenated by said halogen to a mixing zone wherein said halogen and said hydrocarbon are admixed in the absence of light, passing the resultant admixture to a photoreaction zone wherein said resultant admixture is subjected to the action of ultraviolet rays, adding a quantity of oxygen to one of said feed streams so that the minimum oxygen concentration in said resultant admixture is sufficient to inhibit a halogenation reaction between said halogen and said hydrocarbon therein prior to introduction into said photoreaction zone, removing gaseous reaction products from said photoreaction zone, and withdrawing a liquid effluent containing a mixture of said hydrocarbon and halogenated derivatives thereof from said photoreaction zone wherein the quantity of said oxygen added effects an oxygen concentration in said resultant admixture in the range of about 5 to 200 parts per million by weight.

2. The process according to claim 1 wherein the quantity of said oxygen added effects an oxygen concentration in said resultant admixture in the range of about 10 to 100 parts per million by weight.

3. The process according to claim 1 wherein said hydrocarbon is cyclohexane and said halogen is chlorine.

4. The process according to claim 1 further comprising establishing a first signal representative of the temperature differential between one of said feed streams upstream of said mixing zone and said resultant admixture downstream of said mixing zone, comparing said first signal to a second signal representative of a temperature differential indicating the occurrence of a halogenation reaction in said admixture while passing from said mixing zone to said photoreaction zone to obtain a control signal, and adjusting the flow rate of said oxygen being added responsive to said control signal so that the reaction is inhibited.

5. The process according to claim 1 further comprising continuously sampling and determining the oxygen concentration in said halogen feed stream passing to said mixing zone, producing a signal representative of said concentration, and controlling the rate of addition of said oxygen to one of said feed streams so as to maintain said oxygen concentration in said resultant admixture above at least about 10 parts per million by weight.

6. The process according to claim 5 wherein said oxygen is added to said halogen feed stream and the concentration of oxygen in said halogen stream is maintained above at least about 30 parts per million by weight.

7. A method for inhibiting a halogenation reaction between a saturated cyclic or acyclic hydrocarbon feed having 3 to 20 carbon atoms per molecule when admixed with the halogen in the absence of light, said halogen being selected from the group consisting of chlorine and bromine, comprising adding a quantity of oxygen to one of said feeds so that the oxygen concentration in the resultant admixture is in the range of about 10 to 100 parts per million by weight.

References Cited

UNITED STATES PATENTS

| 2,296,614 | 9/1942 | Hearne | 204—163 |
| 2,370,342 | 2/1945 | Zellner | 204—163 |
| 2,948,667 | 8/1960 | Limido et al. | 204—163 |

BENJAMIN R. PADGETT, Primary Examiner

U.S. Cl. X.R.

204—162